(12) United States Patent
Bono

(10) Patent No.: US 8,541,142 B2
(45) Date of Patent: Sep. 24, 2013

(54) FUEL CELL SYSTEM

(75) Inventor: Tetsuya Bono, Nishikamo-gun (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 476 days.

(21) Appl. No.: 12/679,976

(22) PCT Filed: Sep. 1, 2008

(86) PCT No.: PCT/JP2008/066361
§ 371 (c)(1),
(2), (4) Date: Mar. 25, 2010

(87) PCT Pub. No.: WO2009/041271
PCT Pub. Date: Apr. 2, 2009

(65) Prior Publication Data
US 2010/0261078 A1  Oct. 14, 2010

(30) Foreign Application Priority Data
Sep. 28, 2007 (JP) ................ 2007-254615

(51) Int. Cl.
*H01M 8/04* (2006.01)

(52) U.S. Cl.
USPC ........................................ 429/429

(58) Field of Classification Search
USPC ............................... 429/428, 429
See application file for complete search history.

(56) References Cited

U.S. PATENT DOCUMENTS
8,173,314 B2 * 5/2012 Chizawa et al. ............. 429/431

FOREIGN PATENT DOCUMENTS

| DE | 11 2008 000 547 T5 | 1/2010 |
|---|---|---|
| JP | 08-329965 A | 12/1996 |
| JP | 2000-274311 A | 10/2000 |
| JP | 2003-308868 A | 10/2003 |
| JP | 2004-095425 A | 3/2004 |
| JP | 2004-152657 A | 5/2004 |
| JP | 2004-179072 A | 6/2004 |
| JP | 2004-192919 A | 7/2004 |
| JP | 2005-268054 A | 9/2005 |
| JP | 2005-310550 A | 11/2005 |
| JP | 2005-347185 | * 12/2005 |
| JP | 2005-347185 A | 12/2005 |

(Continued)

OTHER PUBLICATIONS

Office Action issued Dec. 21, 2011 in German Patent Application No. 11 2008 002 494.4 & translation thereof.

(Continued)

*Primary Examiner* — Ula C. Ruddock
*Assistant Examiner* — Thomas H. Parsons
(74) *Attorney, Agent, or Firm* — Kenyon & Kenyon LLP

(57) ABSTRACT

A fuel cell system includes: an oxidizing gas supply shut valve; an oxidizing gas exhaust shut valve; a cathode pressure measuring unit as a pressure detection unit for detecting a cathode pressure value which is a pressure of a channel between the oxidizing gas supply shut valve and the oxidizing gas exhaust shut valve; a stop processing unit which closes the oxidizing gas supply shut valve and the oxidizing gas exhaust shut valve when operation of the fuel cell stack is stopped; and a judgment unit which judges whether the operations of the oxidizing gas supply shut valve and the oxidizing gas exhaust shut valve have failed according to the cathode pressure value upon stop when the operation of the fuel cell stack is stopped and the cathode pressure value upon start when the operation of the fuel cell stack is started after the stop.

3 Claims, 3 Drawing Sheets

(56) References Cited

FOREIGN PATENT DOCUMENTS

| JP | 2006-099993 A | 4/2006 |
| JP | 2006-156180 A | 6/2006 |
| JP | 2006-156297 A | 6/2006 |
| JP | 2006-179335 A | 7/2006 |
| JP | 2007-149496 A | 6/2007 |
| WO | WO2006054548 | * 5/2006 |

OTHER PUBLICATIONS

Translation of IPRP mailed Jun. 17, 2010 of PCT/JP2008/006361.

* cited by examiner

FUEL CELL SYSTEM

This is a 371 national phase application of PCT/JP2008/066361 filed 1 Sep. 2008, claiming priority to Japanese Patent Application No. JP 2007-254615 filed 28 Sep. 2007, the contents of which are incorporated herein by reference.

TECHNICAL FIELD

The present invention relates to a fuel cell system, and more particularly to a fuel cell system in which a valve is provided in each of flow paths for supplying or exhausting oxidizing gas or fuel gas to or from a fuel cell stack.

BACKGROUND ART

A valve is provided in each of flow paths for supplying fuel gas or oxidizing gas to a fuel cell and for exhausting the fuel gas or oxidizing gas from the fuel cell. In order to detect failure of these valves to open, for example, Patent Document 1 discloses a device comprising a first opening/closing valve which is placed on a fuel gas supply pipe connected to the fuel cell, a second opening/closing valve which is placed downstream of the first opening/closing valve along a direction of flow of the fuel gas, a first pressure sensor which detects pressure of the fuel gas between the first opening/closing valve and the second opening/closing valve, a stop-time open/close valve operating unit which closes the first opening/closing valve and then the second opening/closing valve when the fuel cell is stopped, a stop-time pressure memory which stores at least an output of the first pressure sensor when the fuel cell is stopped, and a failure diagnosis unit which compares the output of the first pressure sensor when operation is re-started after the fuel cell is stopped and the output of the first pressure sensor when the fuel cell is stopped stored in the stop-time pressure memory, and diagnoses whether or not at least one of the first opening/closing valve and the second opening/closing valve has failed. In this reference, it is described that, when the pressure value in a volume section defined by the first opening/closing valve and the second opening/closing valve changes to a greater value, it is judged that the first opening/closing valve has failed, and, when the pressure value changes to a smaller value, it is judged that the second opening/closing valve has failed.
Patent Document 1: JP 2004-95425 A

DISCLOSURE OF INVENTION

Problem to be Solved

As described above, with the use of the structure of Patent Document 1, it is possible to detect the opening failure of the first opening/closing valve or the second opening/closing valve placed on the fuel gas supply pipe. However, using the structure of Patent Document 1 involves a restriction that the operation to first close the first opening/closing valve and then close the second opening/closing valve when the fuel cell is stopped, in order to produce the pressure difference in the volume section defined by the opening/closing valves, which is inconvenient. In addition, when the pressure in the fuel gas tank is originally small, the pressure difference would be small even after the above-described operation to close the opening/closing valves, and, thus, it may not be possible to detect the opening failure. Therefore, the structure of Patent Document 1 can be applied to only a narrow range of structures.

An advantage of the present invention lies in provision of a fuel cell system in which an operation deficiency of a valve provided on a flow path can be more easily detected.

Means for Solving the Problem

According to one aspect of the present invention, there is provided a fuel cell system comprising an oxidizing gas supply valve provided on a flow path for supplying oxidizing gas to a fuel cell stack, an oxidizing gas exhaust valve provided on a flow path for exhausting oxidizing gas from the fuel cell stack, a pressure detecting unit which detects a cathode pressure value which is a pressure in a flow path between the oxidizing gas supply valve and the oxidizing gas exhaust valve and including an oxidizing gas flow path in the fuel cell stack, a stop processor which closes the oxidizing gas supply valve and the oxidizing gas exhaust valve when an operation of the fuel cell stack is stopped, and a judging unit which judges operation deficiency of the oxidizing gas supply valve and the oxidizing gas exhaust valve based on a stop-time cathode pressure value when the operation of the fuel cell stack is stopped and a startup cathode pressure value when the fuel cell stack is started up after the operation of the fuel cell stack is stopped.

According to another aspect of the present invention, preferably, in the fuel cell system, the judging unit judges that at least one of the oxidizing gas supply valve and the oxidizing gas exhaust valve is in the operation deficiency state when a value obtained by subtracting the startup cathode pressure value from the stop-time cathode pressure value is less than or equal to a predetermined threshold value.

According to another aspect of the present invention, there is provided a fuel cell system comprising a fuel gas supply valve provided on a flow path for supplying fuel gas to a fuel cell stack, a fuel gas exhaust valve provided on a flow path for exhausting the fuel gas from the fuel cell stack, a pressure detecting unit which detects an anode pressure value which is a pressure in a flow path between the fuel gas supply valve and the fuel gas exhaust valve and including a fuel gas flow path in the fuel cell stack, a stop processor which closes the fuel gas supply valve and the fuel gas exhaust valve when an operation of the fuel cell stack is stopped, and a judging unit which judges operation deficiency of the fuel gas supply valve and the fuel gas exhaust valve based on a stop-time anode pressure value when the operation of the fuel cell stack is stopped and a startup anode pressure value when the fuel cell stack is started up after the operation of the fuel cell stack is stopped.

According to another aspect of the present invention, preferably, in the fuel cell system, the judging unit judges that at least one of the fuel gas supply valve and the fuel gas exhaust valve is in the operation deficiency state when a value obtained by subtracting the startup anode pressure value from the stop-time anode pressure value is less than or equal to a predetermined threshold value.

According to another aspect of the present invention, preferably, in the fuel cell system, the judging unit executes the operation deficiency judgment when a time period from the time when the operation of the fuel cell stack is stopped to the time when the fuel cell stack is started up after the operation of the fuel cell stack is stopped is greater than or equal to a predetermined time period which is defined in advance.

Advantages

According to at least one of the above-described configurations, the fuel cell system has a judgment unit which judges operation deficiency of the oxidizing gas supply value and the oxidizing gas exhaust valve based on the stop-time cathode pressure value when the operation of the fuel cell stack is stopped and the startup cathode pressure value when the fuel cell stack is started up after the operation of the fuel cell stack is stopped. Therefore, it is possible to more easily detect the operation deficiency of the valve provided on flow paths through which the oxidizing gas flows.

In addition, the judgment unit judges that at least one of the oxidizing gas supply valve and the oxidizing gas exhaust valve is in the operation deficiency state when the value obtained by subtracting the startup cathode pressure value from the stop-time cathode pressure value is less than or equal to a predetermined threshold value. Therefore, it is possible to more easily detect the operation deficiency of the valve provided on a flow path through which the oxidizing gas flows.

According to at least one of the above-described configurations, the fuel cell system includes a judgment unit which judges the operation deficiency of the fuel gas supply valve and the fuel gas exhaust valve based on a stop-time anode pressure value when the operation of the fuel cell stack is stopped and the startup anode pressure value when the fuel cell stack is started up after the operation of the fuel cell stack is stopped. Therefore, it is possible to more easily detect the operation deficiency of the valves provided on the flow paths through which the fuel gas flows.

In addition, the judgment unit judges that at least one of the fuel gas supply valve and the fuel gas exhaust valve is in the operation deficiency state when the value obtained by subtracting the startup anode pressure value from the stop-time anode pressure value is less than or equal to a predetermined threshold value. Therefore, it is possible to more easily detect operation deficiency of the valves provided on the flow paths through which the fuel gas flows.

Moreover, the judgment unit executes the operation deficiency judgment when the time period from the time when the operation of the fuel cell stack is stopped to the time when the fuel cell stack is started up after the operation of the fuel cell stack is stopped is greater than or equal to a predetermined time period which is defined in advance. Therefore, the operation deficiency judgment can be executed in a state where the cathode pressure value or the anode pressure value is sufficiently lowered, and, thus, it is possible to more accurately detect the operation deficiency of the valves provided on the flow paths.

EXPLANATION OF REFERENCE NUMERALS

10 FUEL CELL SYSTEM; 12, 14 CATHODE PRESSURE CHARACTERISTIC CURVE; FUEL CELL BODY: 21 ANODE PRESSURE MEASURING DEVICE; 22 FUEL CELL STACK; 23 CATHODE PRESSURE MEASURING DEVICE; 24 HUMIDIFIER; 26 FUEL GAS TANK; 28 DILUTER; 30 CONTROLLER; 32 OXIDIZING GAS SUPPLY SHUTOFF VALVE; 34 OXIDIZING GAS EXHAUST SHUTOFF VALVE; 35 OXIDIZING GAS HUMIDIFIER BYPASS FLOW PATH; 36 OXIDIZING GAS HUMIDIFIER BYPASS SHUTOFF VALVE; 37 OXIDIZING GAS SUPPLY-SIDE FLOW PATH; 38 OXIDIZING GAS PATH; 39 OXIDIZING GAS EXHAUST-SIDE FLOW PATH; 40 OXIDIZING GAS SOURCE; 45 PRESSURE ADJUSTMENT VALVE; 46 REGULATOR; 47 FLOW DIVERTER; 48 EXHAUST VALVE; 49 CIRCULATION PRESSURE INCREASING DEVICE; 50 ELECTROMAGNETIC VALVE STORAGE BOX; 74, 76 ELECTROMAGNETIC VALVE; 101 FC SYSTEM CONTROL INSTRUCTION OBTAINING MODULE; 102 FC SYSTEM STARTUP MODULE; 103 FC SYSTEM OPERATION MODULE; 104 FC SYSTEM STOP MODULE; 106 CATHODE PRESSURE MEASUREMENT MODULE; 108 ELAPSED TIME JUDGMENT MODULE; 109 OPERATION DEFICIENCY JUDGMENT MODULE; 110 MEMORY; 130 NOTIFICATION DEVICE; 140 ELAPSED TIME MEASURING DEVICE; 150 CONTROL INSTRUCTION OBTAINING UNIT

BEST MODE FOR CARRYING OUT THE INVENTION

A preferred embodiment of the present invention will now be described in detail with reference to the drawings. In the following description, there is described a fuel cell system wherein a shutoff valve which is controlled using a gas pressure is provided on a flow path on a cathode side of the fuel cell, but the present invention is not limited to such a configuration, and the shutoff valve may be provided on a flow path on the anode side. In addition, in the following description, there is described a fuel cell system with the valves provided on the flow paths being shutoff valves which are controlled using gas pressure, but the present invention is not limited to such a configuration, and other valves such as an electromagnetic valve which is electrically controlled may alternatively be used.

Figure 1:
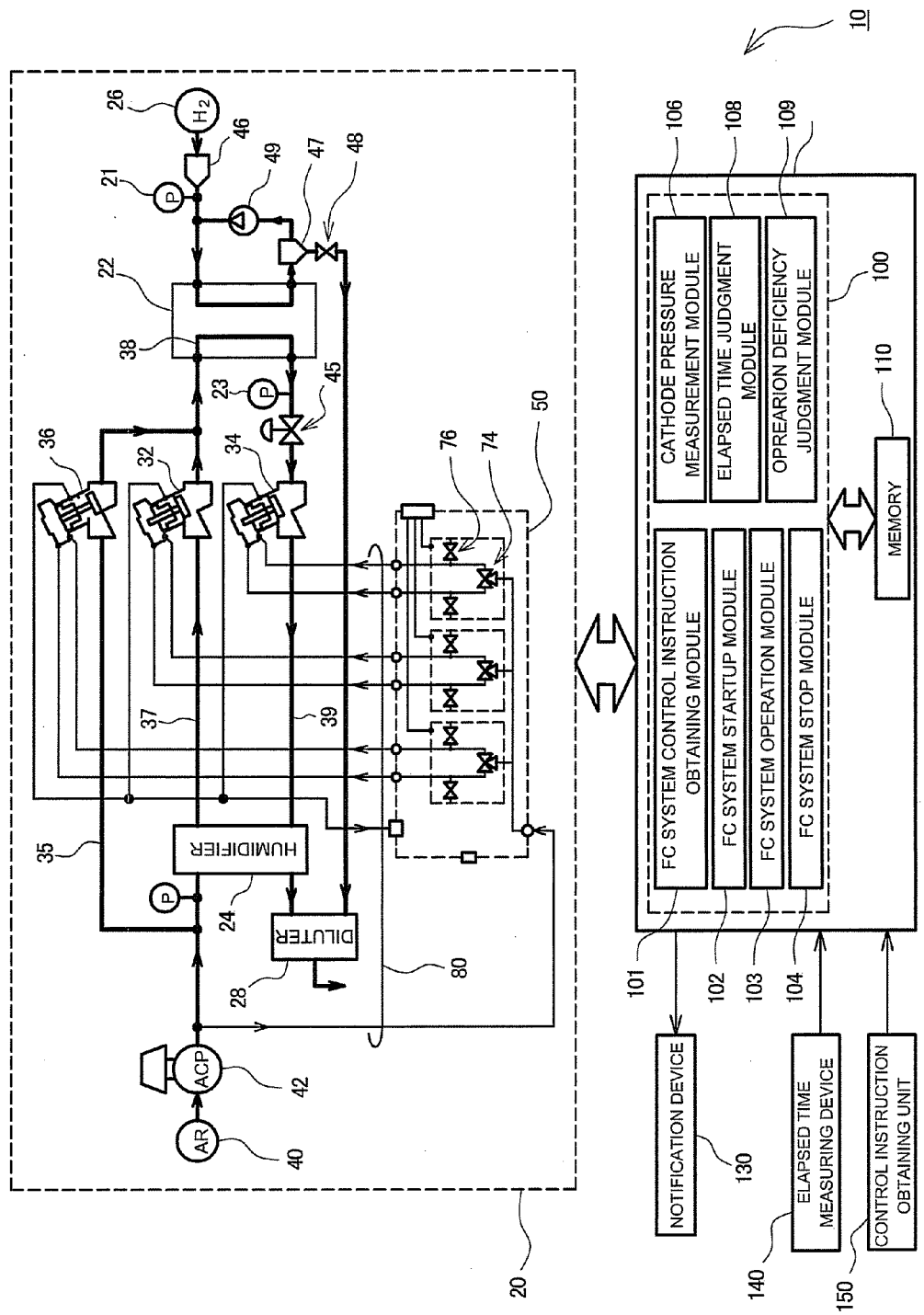
FIG. 1 is a diagram showing a structure of a fuel cell system according to a preferred embodiment of the present invention.

FIG. 1 is a diagram showing a structure of a fuel cell system 10. The fuel cell system 10 comprises a fuel cell body 20 and a controller. The fuel cell system 10 comprises a fuel cell stack 22 in which a plurality of fuel battery cells are stacked, elements for supplying fuel gas placed on the anode side of the fuel cell stack 22, and elements for supplying oxidizing gas placed on the cathode side.

The fuel cell stack 22 is a battery pack wherein a plurality of unit cells are stacked, the unit cell being obtained by placing separators on both ends of an MEA (Membrane Electrode Assembly) in which catalyst electrode layers are placed on both sides of an electrolytic membrane, and sandwiching the MEA with the separators. The fuel cell stack 22 has a function to supply fuel gas such as hydrogen to the anode side; to supply oxidizing gas including oxygen, such as air, to the cathode side; to generate power through electrochemical reaction through the electrolytic membrane; and to extract necessary power.

A fuel gas tank 26 on the anode side is a hydrogen gas source and supplies hydrogen as fuel gas. A regulator 46 connected to the fuel gas tank 26 has a function to adjust the gas from the fuel gas tank 26 which is the hydrogen gas source to a suitable pressure and flow rate. An anode pressure measuring device 21 provided at an output exit of the regulator 46 is a measuring device which detects pressure of supplied hydrogen. The output exit of the regulator 46 is connected to the anode-side entrance of the fuel cell stack 22, and the fuel gas having its pressure and flow rate suitably adjusted is supplied to the fuel cell stack 22.

A flow diverter 47 connected to an anode-side exit of the fuel cell stack 22 is provided for supplying exhaust gas through an exhaust valve 48 to a diluter 28 when the concentration of the impurity gas in the exhaust gas from the anode-side exit is increased. In addition, a circulation pressure increasing device 49 provided downstream of the flow diverter 47 and before the anode-side entrance is a hydrogen pump having a function to increase the partial pressure of hydrogen of the gas returning from the anode-side exit, to return the gas to the anode-side entrance, and to reuse the gas.

For an oxidizing gas source 40 on the cathode side, in practice, atmospheric air may be used. The atmospheric air which is the oxidizing gas source 40 is supplied through a filter to an air compressor (ACP) 42. The ACP 42 is a gas pressure increasing device which compresses, in volume, the oxidizing gas with a motor, and increases the pressure of the oxidizing gas.

A humidifier 24 has a function to suitably humidify oxidizing gas, for efficient fuel cell reaction at the fuel cell stack 22. The oxidizing gas which is suitably humidified by the humidifier 24 is supplied to the cathode-side entrance of the fuel cell stack 22, and is exhausted from the cathode-side exit. As the temperature of the fuel cell stack 22 is increased due to the fuel cell reaction, the exhaust water is in the form of water vapor, and the water vapor is returned to the humidifier 24 so that the oxidizing gas can be suitably humidified.

A pressure meter provided downstream of the exit of the fuel cell stack 22 in an oxidizing gas exhaust-side flow path 39 can be called a cathode pressure measuring device 23. The cathode pressure measuring device 23 is a pressure detecting unit which detects a pressure of a flow path between an oxidizing gas supply shutoff valve 32 and an oxidizing gas exhaust shutoff valve 34 to be described later.

A pressure adjustment valve 45 provided downstream of the cathode pressure measuring device 23 is also called a back pressure valve, and has a function to adjust a gas pressure at the cathode-side exit, and to adjust the flow rate of the oxidizing gas to the fuel cell stack 22. An output exit of the pressure adjustment valve 45 is connected to the humidifier 24, and, thus, after the gas exiting the pressure adjustment valve 45 supplies water vapor to the humidifier 24, the gas enters the diluter 28, and is then exhausted to the outside.

The diluter 28 is a buffer container for collecting hydrogen from the exhaust valve 48 on the anode side in which impurity gas and moisture are mixed, and moisture-mixed hydrogen leaking from the cathode side through the MEA, and exhausting the same to the outside with a suitable hydrogen concentration.

The oxidizing gas supply shutoff valve 32 connected and provided between the humidifier 24 and the fuel cell stack 22 in an oxidizing gas supply-side flow path 37 is an open/close valve which is normally opened and is closed when the operation of the fuel cell stack 22 is stopped or the like. The oxidizing gas supply-side flow path 37 is closed to stop the supply of the oxidizing gas when the operation of the fuel cell stack 22 is stopped, in order to inhibit oxidation or the like of the catalyst layer included in the fuel cell stack 22.

In addition, the oxidizing gas exhaust shutoff valve 34 connected and provided between the fuel cell stack 22 and the humidifier 24; more specifically, between the pressure adjustment valve 45 and the humidifier 24 in the oxidizing gas exhaust-side flow path 39, is an open/close valve which is normally opened and is closed when the operation of the fuel cell system 10 is stopped or the like, similar to the oxidizing gas supply shutoff valve 32.

In addition, an oxidizing gas humidifier bypass flow path 35 is provided in the oxidizing gas supply-side flow path 37, bypassing the humidifier 24, and in parallel to the flow path through the oxidizing gas supply shutoff valve 32. An oxidizing gas humidifier bypass shutoff valve 36 connected and placed on the oxidizing gas humidifier bypass flow path 35 is an open/close valve which is normally closed and is opened as necessary.

The oxidizing gas supply shutoff valve 32, the oxidizing gas exhaust shutoff valve 34, and the oxidizing gas humidifier bypass shutoff valve 36 differ in that the former two valves are normally in an open state and the oxidizing gas humidifier bypass shutoff valve 36 is normally in a closed state, but the structures are almost identical. Each of the oxidizing gas supply shutoff valve 32, the oxidizing gas exhaust shutoff valve 34, and the oxidizing gas humidifier bypass shutoff valve 36 is a fluid-controlled valve having a movable element such as a piston which operates according to an internal pressure of a pressure chamber.

For example, the oxidizing gas supply shutoff valve 32 has a duct in which the movable element such as the piston can move back and forth; the entrance side of the duct is connected to the oxidizing gas supply-side flow path 37 on the side near the humidifier 24, and the exit side of the duct is connected to the oxidizing gas supply-side flow path 37 on the side near the fuel cell stack 22. When the internal pressure of the pressure chamber is changed and the movable element enters the duct, the duct in the oxidizing gas supply shutoff valve 32 is closed, and the flow of the oxidizing gas is blocked. In this manner, by controlling the internal pressure of the pressure chamber to move the movable element back and forth, it is possible to block; that is, shut, the flow of the oxidizing gas in the oxidizing gas supply-side flow path 37 as necessary.

An electromagnetic valve storage box 50 is a box which collectively stores electromagnetic valves 74 and 76 for controlling supply of operation fluid for the oxidizing gas supply shutoff valve 32, the oxidizing gas exhaust shutoff valve 34, and the oxidizing gas humidifier bypass shutoff valve 36. For each of the oxidizing gas supply shutoff valve 32, the oxidizing gas exhaust shutoff valve 34, and the oxidizing gas humidifier bypass shutoff valve 36, the electromagnetic valve 74, which is a three-way valve, and the electromagnetic valve 76, which consists of two two-way valves, are used, to control the internal pressure of the pressure chamber of the oxidizing gas supply shutoff valve 32, the oxidizing gas exhaust shutoff valve 34, and the oxidizing gas humidifier bypass shutoff valve 36.

An elapsed time measuring device 140 is a measuring device which is connected to a controller 30 and which measures an elapsed time period from the time when the operation of the fuel cell stack 22 is stopped to the time when the fuel cell stack 22 is re-started after the operation is stopped. For example, the elapsed time measuring device 140 can be formed from a counter circuit or the like.

A control instruction obtaining unit 150 is connected to the controller 30, and has a function to obtain a startup instruction of the fuel cell stack 22 and an operation stop instruction of the fuel cell stack 22, which are supplied from the outside.

A notification device 130 is a device which is connected to the controller 30 and which notifies the user or the like of the operation deficiency (failure) of the oxidizing gas supply shutoff valve 32 and the oxidizing gas exhaust shutoff valve 34 in the fuel cell system 10. The notification device 130 is placed near a steering wheel provided in a driver seat.

The controller 30 comprises a CPU 100 and a memory 110. The controller 30 has a function to control the overall operation of the fuel cell body 20 and judge the operation deficiency of the valves provided in the fuel cell body 20. The controller 30 is formed from a computer which is suited for a fuel cell.

The CPU 100 comprises an FC system control instruction obtaining module 101, an FC system startup module 102, an FC system operation module 103, an FC system stop module 104, a cathode pressure measurement module 106, an elapsed time judgment module 108, and an operation deficiency judgment module 109. These functions can be realized by executing software, and, more specifically, by executing a shutoff valve operation deficiency judgment program stored in the memory 110. Alternatively, a portion of or all of these functions may be realized by means of hardware. The memory 110 is a memory device which stores the shutoff valve operation deficiency judgment program and stores other necessary information.

The FC system control instruction obtaining module 101 has a function to judge whether the instruction obtained by the control instruction obtaining unit 150 is a startup instruction of the fuel cell stack 22 or an operation stop instruction of the fuel cell stack 22.

The FC system startup module 102 has a function to receive the startup instruction of the fuel cell stack 22, and execute a startup control of the fuel cell stack 22. The FC system startup module 102 also has a function to execute a control to open the oxidizing gas supply shutoff valve 32 and the oxidizing gas exhaust shutoff valve 34 during startup of the fuel cell stack 22.

The FC system operation module 103 has a function to execute an operation control of the fuel cell stack 22 after the FC system startup module 102 starts up the fuel cell stack 22.

The FC system stop module 104 has a function to receive the operation stop instruction of the fuel cell stack 22 and execute a control to stop the operation of the fuel cell stack 22. In addition, the FC system stop module 104 has a function to execute a control to close the oxidizing gas supply shutoff valve 32 and the oxidizing gas exhaust shutoff valve 34 during stopping of the operation of the fuel cell stack 22.

The cathode pressure measurement module 106 measures, by means of the cathode pressure measuring device 23, the pressure value of the oxidizing gas path 38 in the fuel cell stack 22 when the operation of the fuel cell stack 22 is stopped, and stores the stop-time cathode pressure value in the memory 110. The cathode pressure measurement module 106 also measures, by means of the cathode pressure measuring device 23, the pressure value of the oxidizing gas path 38 when the fuel cell stack 22 is again started up after the operation of the fuel cell stack 22 is stopped, and stores the startup cathode pressure value in the memory 110.

The elapsed time judgment module 108 has a function to judge whether or not the time period measured by the elapsed time measuring device 140 falls within a judgment prohibition period to be described later (for example, 20 minutes after the operation of the fuel cell stack 22 is stopped).

The operation deficiency judgment module 109 has a function to judge the operation deficiency of the oxidizing gas supply shutoff valve 32 and the oxidizing gas exhaust shutoff valve 34. More specifically, the operation deficiency judgment module 109 extracts, from the memory 110, two cathode pressure values; that is, the stop-time cathode pressure value when the operation of the fuel cell stack 22 is stopped and the startup cathode pressure value when the fuel cell stack 22 is re-started, and compares the two cathode pressure value, to judge the operation deficiency of the oxidizing gas supply shutoff valve 32 and the oxidizing gas exhaust shutoff valve 34. The operation deficiency judgment module 109 notifies the user or the like through the notification device 130.

Figure 2:
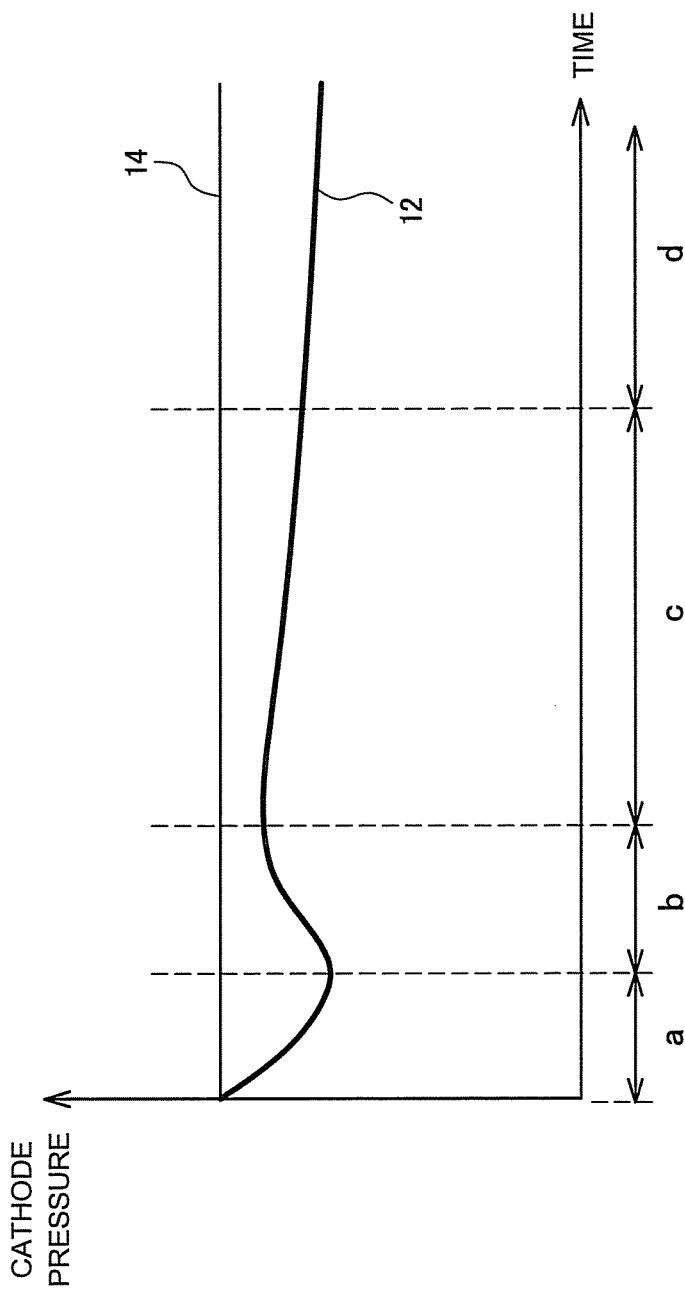
FIG. 2 is a diagram showing a change with respect to time of a cathode pressure value after operation of the fuel cell stack is stopped, showing the cathode pressure value along a vertical axis and time along a horizontal axis.

FIG. 2 is a diagram showing a change with respect to time of the cathode pressure value after the operation of the fuel cell stack 22 is stopped, representing the cathode pressure value along a vertical axis and time along a horizontal axis. FIG. 2 shows a cathode pressure characteristic curve 12 which shows a normal change of the cathode pressure value, and a cathode pressure characteristic curve 14 which shows an abnormal change of the cathode pressure value. Here, when the fuel cell system 10 is stopped, during stopping of the operation of the fuel cell stack 22, the oxidizing gas supply shutoff valve 32 and the oxidizing gas exhaust shutoff valve 34 are closed. In this state, the supply of oxidizing gas to the fuel cell stack 22 can be stopped, but the oxidizing gas (oxygen and nitrogen) still remains in the fuel cell stack 22. Therefore, at the time immediately after the operation of the fuel cell stack 22 is stopped, the cathode pressure value has an initial value as shown in FIG. 2.

One of the curves, the cathode pressure characteristic curve 12 is a curve showing a state where there is no opening failure, which is one form of operation deficiency in the oxidizing gas supply shutoff valve 32 and the oxidizing gas exhaust shutoff valve 34, and the cathode pressure value changes normally with time. The change with respect to time of the cathode pressure value in the cathode pressure characteristic curve 12 can be described in three distinct periods of period a, period b, and period c. Next, each of the period a, the period b, and the period c will be described in detail. Here, the opening failure refers to a state where the valve provided on the flow path is in the opened state although the valve should be closed. When the oxidizing gas humidifier bypass shutoff valve 36 has the opening failure, the change with respect to time of the cathode pressure value of the fuel cell stack 22 would be similar to the change with respect to time shown by the cathode pressure characteristic curve 14 to be described later. For the purpose of this description, it is assumed that there is no opening failure in the oxidizing gas humidifier bypass shutoff valve 36. In addition, in the following, the operation deficiency is assumed to be opening failure, unless another deficiency is specifically identified.

In the period a, the hydrogen remaining in the anode side of the fuel cell stack 22 permeates from the anode side to the cathode side, and reacts with oxygen which remains on the cathode side of the fuel cell stack 22. Thus, the amount of oxygen in the cathode side of the fuel cell stack 22 is reduced, and the cathode pressure value is reduced.

In the period b, after most of the oxygen remaining in the cathode side of the fuel cell stack 22 is consumed, there exists almost no oxygen which can react with hydrogen permeating from the anode side of the fuel cell stack 22 to the cathode side. Thus, because there is hydrogen which cannot react, the cathode pressure is temporarily increased.

In the period c, as the nitrogen remaining in the cathode side of the fuel cell stack 22 has a lower permeation speed than hydrogen, the nitrogen slowly permeates from the cathode side to the anode side. Thus, the pressure of the cathode side of the fuel cell stack 22 is reduced because the amount of nitrogen is reduced.

As shown in FIG. 2, in the periods a and b, the cathode pressure is temporarily reduced and then temporarily increased. Therefore, if the fuel cell stack 22 is re-started, the cathode pressure value is measured, and the stop-time cathode pressure value and the startup cathode pressure value are compared during this period, there is a possibility of erroneous judgment with regard to the operation deficiency of the oxidizing gas supply shutoff valve 32 and the oxidizing gas exhaust shutoff valve 34. Thus, these periods a and b are called judgment prohibition periods (for example, time periods within 20 minutes from stopping of the operation of the fuel cell stack 22), and, it is possible to employ a configuration in which, when the fuel cell stack 22 is started up during this judgment prohibition period, the judgment of the oxidizing gas supply shutoff valve 32 and the oxidizing gas exhaust shutoff valve 34 is not executed. After the period c has been entered, the difference between two cathode pressure values is sufficiently large, and, thus, erroneous judgment can be inhibited with regard to the judgment of the operation deficiency of the oxidizing gas supply shutoff valve 32 and the oxidizing gas exhaust shutoff valve 34. In addition, preferably, in order to secure sufficient time to reduce the possibility of erroneous judgment, for example, the judgment may be executed when the fuel cell stack 22 is started up, for example, after 2 hours or more has elapsed (period d in FIG. 2) after the operation of the fuel cell stack 22 is stopped.

The other curve, the cathode pressure characteristic curve 14, is a curve which shows a case in which there is an operation deficiency in at least one of the oxidizing gas supply shutoff valve 32 and the oxidizing gas exhaust shutoff valve 34, and the cathode pressure value does not change in a normal manner with respect to time. In the cathode pressure characteristic curve 14, hydrogen remaining on the anode side of the fuel cell stack 22 permeates from the anode side to the cathode side, and reacts with oxygen remaining on the cathode side of the fuel cell stack 22, and, thus, the amount of oxygen on the cathode side of the fuel cell stack 22 is reduced. However, because oxidizing gas is newly supplied through at least one of the oxidizing gas supply shutoff valve 32 and the oxidizing gas exhaust shutoff valve 34 which is in the operation deficiency state, the state where the cathode pressure value does not significantly change is continued.

Figure 3:
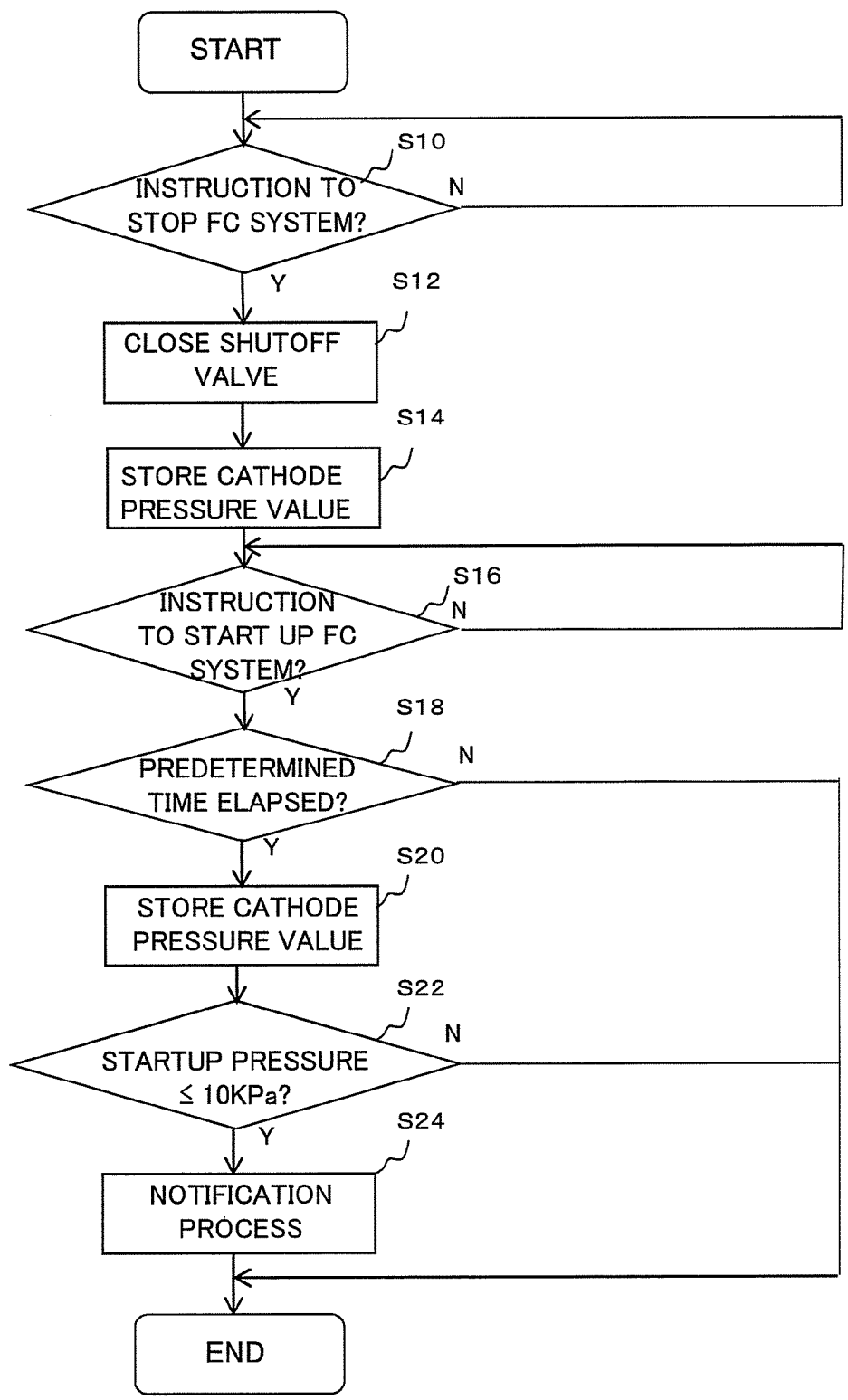
FIG. 3 is a flowchart showing processes of judgment of operation deficiency of an oxidizing gas supply shutoff valve and an oxidizing gas exhaust shutoff valve provided on flow paths in a fuel cell system.

An operation of the above-described structure will now be described with reference to the drawings. FIG. 3 is a flowchart showing steps of judgment of operation deficiency of the oxidizing gas supply shutoff valve 32 and the oxidizing gas exhaust shutoff valve 34 provided on flow paths in the fuel cell system 10. The steps correspond to the steps of processes of the shutoff valve operation deficiency judgment program. The operation will be described with reference also to the reference numerals of FIGS. 1 and 2.

When the shutoff valve operation deficiency program is started, first, it is judged whether or not an instruction obtained by the control instruction obtaining unit 150 is an instruction to stop operation of the fuel cell stack 22 (S10). When it is judged that the instruction is not the instruction to stop operation of the fuel cell stack 22, processing returns to S10 after a predetermined time is elapsed. This function is executed by the function of the FC system control instruction obtaining module 101 of the CPU 100.

When it is judged that the instruction is the instruction to stop the operation of the fuel cell stack 22, a control is applied to close the oxidizing gas supply shutoff valve 32 and the oxidizing gas exhaust shutoff valve 34 (S12). This function is executed by the function of the FC system stop module 104 of the CPU 100. Subsequently, processing proceeds from S12 to S14.

Then, when the fuel cell stack 22 is stopped, the pressure value of the oxidizing gas path 38 in the fuel cell stack 22 is measured by means of the cathode pressure measuring device 23, and the stop-time cathode pressure value is stored in the memory 110 (S14). This function is executed by the function of the cathode pressure measurement module 106 of the CPU 100. Processing then proceeds from S14 to S16.

It is judged whether or not an instruction obtained by the control instruction obtaining unit 150 is an instruction to start up the fuel cell stack 22 (S16). When it is judged that the instruction is not the startup instruction of the fuel cell stack 22, processing returns to S16 after a predetermined time has elapsed. This function is executed by the function of the FC system control instruction obtaining module 101 of the CPU 100.

When it is judged that the instruction is the startup instruction of the fuel cell stack 22, it is judged whether or not the time period measured by the elapsed time measuring device 140 exceeds the judgment prohibition period (S18). When it is judged that the judgment prohibition period is not exceeded, the process proceeds to an END process which is a completion process of the program. When, on the other hand, it is judged that the judgment prohibition period is exceeded, processing proceeds to S20. This function is executed by the function of the elapsed time judgment module 108 of the CPU 100.

During the startup of the fuel cell stack 22, the pressure value of the oxidizing gas path 38 in the fuel cell stack 22 is measured by the cathode pressure measuring device 23, and the startup cathode pressure value is stored in the storage 110 (S20). This function is executed by the function of the cathode pressure measurement module 106 of the CPU 100. Processing then proceeds from S20 to S22.

It is judged whether or not a value obtained by subtracting the startup cathode pressure value at the re-start of the fuel cell stack 22 from the stop-time cathode pressure value at the stop of operation of the fuel cell stack 22 is less than or equal to 10 kPa (S22). When the difference between two cathode pressure values is less than or equal to 10 kPa, it is judged that at least one of the oxidizing gas supply shutoff valve 32 and the oxidizing gas exhaust shutoff valve 34 among the oxidizing gas supply shutoff valve 32 and the oxidizing gas exhaust shutoff valve 34 is in operation deficiency state, and a notification is sent to the user through the notification device 130 notifying that at least one of the oxidizing gas supply shutoff valve 32 and the oxidizing gas exhaust shutoff valve 34 is in the operation deficiency state (S24). When the difference between the two cathode pressure values is greater than or equal to 10 kPa, processing proceeds to the END process which is the completion process of the program. This function is executed by the operation deficiency judgment module 109 of the CPU 100.

Therefore, as described above, by judging whether or not a value obtained by subtracting the startup cathode pressure value at the re-start of the fuel cell stack 22 from the stop-time cathode pressure value at the stop of the operation of the fuel cell stack 22 is less than or equal to a predetermined threshold value (here, 10 kPa), it is possible to detect the operation deficiency of the oxidizing gas supply shutoff valve 32 and the oxidizing gas exhaust shutoff valve 34, and to notify the user of the result. In addition, in the above description, it is assumed that the oxidizing gas humidifier bypass shutoff valve 36 is not in the operation deficiency state. However, as described above, when the oxidizing gas humidifier bypass shutoff valve 36 is in the operation deficiency state also, the cathode pressure value shows the change with respect to time similar to the cathode pressure characteristic curve 14. Therefore, the value obtained by subtracting the startup cathode pressure value during the re-start of the fuel cell stack 22 from the stop-time cathode pressure value at the stop of operation of the fuel cell stack 22 becomes less than or equal to a predetermined threshold value. Therefore, it is possible to also detect the operation deficiency of the oxidizing gas humidifier bypass shutoff valve 36.

Alternatively, in place of the configuration to immediately judge the operation deficiency when it is once judged that the difference between two cathode pressure values is less than or equal to the threshold value as described above, it is also possible to employ a configuration in which the stopping of the operation and startup of the fuel cell stack 22 are repeated, and a counter circuit (not shown) is incremented every time the operation deficiency is judged during a plurality of the judgment operations. When the value of the counter circuit reaches a predetermined value (for example, 10), it is judged that the device is in the operation deficiency state, and the user can be notified of the operation deficiency of at least one of the oxidizing gas supply shutoff valve 32 and the oxidizing gas exhaust shutoff valve 34 through the notification device 130. In addition, it is also possible to employ a configuration in which, during the process of incrementing the counter circuit, when a phenomenon of the difference of pressure values being greater than or equal to the threshold value; that is, the judgment of no operation deficiency, is repeated a few times, it is judged that there is no operation deficiency in the oxidizing gas supply shutoff valve 32 and the oxidizing gas exhaust shutoff valve 34, and the count value of the counter circuit is cleared. By means of such a configuration, it is possible to more accurately detect the operation deficiency of the oxidizing gas supply shutoff valve 32 and the oxidizing gas exhaust shutoff valve 34, and notify the user of the result.

The invention claimed is:

1. A fuel cell system comprising:
an oxidizing gas supply valve provided on a flow path for supplying oxidizing gas which is air to a fuel cell stack;
an oxidizing gas exhaust valve provided on a flow path for exhausting the oxidizing gas from the fuel cell stack;
a pressure detecting unit which detects a cathode pressure value which is a pressure in a flow path between the oxidizing gas supply valve and the oxidizing gas exhaust valve and including an oxidizing gas flow path in the fuel cell stack;
a stop processor which closes the oxidizing gas supply valve and the oxidizing gas exhaust valve when an operation of the fuel cell stack is stopped; and
a judging unit programmed to receive pressure information from the pressure detecting unit and determine whether there is an operation deficiency of the oxidizing gas supply valve and the oxidizing gas exhaust valve based on a stop-time cathode pressure value when the operation of the fuel cell stack is stopped and a startup cathode pressure value when the fuel cell stack is started up after the operation of the fuel cell stack is stopped,
wherein the startup cathode pressure value is taken after a predetermined time period has elapsed from the time that the fuel cell stack is stopped, wherein the predetermined time period is greater than or equal to a total time period of a time period in which a cathode pressure is reduced due to reaction of the fuel gas and remaining oxygen in the oxidizing gas, a time period in which the cathode pressure is temporarily increased due to the presence of the fuel gas after the remaining oxygen in the oxidizing gas is depleted, and a time period in which the cathode pressure is reduced due to reduction of nitrogen remaining in the oxidizing gas.

2. The fuel cell system according to claim 1,
wherein the judging unit is programmed to determine that at least one of the oxidizing gas supply valve and the oxidizing gas exhaust valve is in the operation deficiency state when a value obtained by subtracting the startup cathode pressure value from the stop-time cathode pressure value is less than or equal to a predetermined threshold value.

3. The fuel cell system of claim 1, further comprising a notification device that is operably coupled to the judging unit, wherein the notification device is configured to indicate whether there is a valve operation deficiency.

* * * * *

UNITED STATES PATENT AND TRADEMARK OFFICE
CERTIFICATE OF CORRECTION

PATENT NO. : 8,541,142 B2
APPLICATION NO. : 12/679976
DATED : September 24, 2013
INVENTOR(S) : Tetsuya Bono It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 527 days.

Signed and Sealed this
Fifteenth Day of September, 2015

Michelle K. Lee
*Director of the United States Patent and Trademark Office*